United States Patent [19]

Nishikawa et al.

[11] Patent Number: 5,610,454
[45] Date of Patent: Mar. 11, 1997

[54] WIRE HARNESS PRODUCTION CONTROLLING METHOD

[75] Inventors: Yasuo Nishikawa; Hiroyuki Nakajima; Hitoshi Iwata; Yoshihiro Kumazawa; Naohito Sawamura; Hiroshi Nakamura; Ichiro Suzuki; Shigeru Kobayashi; Ryuichi Nabeshima; Takao Sakashita, all of Mie-ken; Kazuhiko Okino, Iwate-ken; Kiyoshi Taira, Iwate-ken; Koukichi Takamura, Iwate-ken; Mitsuyoshi Omaki, Iwate-ken, all of Japan

[73] Assignee: Sumitomo Wiring Systems, Ltd., Mie-ken, Japan

[21] Appl. No.: 77,034

[22] Filed: Jun. 16, 1993

[30] Foreign Application Priority Data

Jun. 17, 1992 [JP] Japan .................................. 4-158243

[51] Int. Cl.⁶ .................................. H02B 1/04; H02B 1/20
[52] U.S. Cl. .................................. 307/147; 361/826; 439/34; 29/755; 174/72 A
[58] Field of Search .................................. 361/826, 827; 307/9.1, 10.1, 12, 148, 38, 147; 439/34, 505; 29/857, 33 F, 755, 863; 174/72 A, 72 R, 71 R

[56] References Cited

U.S. PATENT DOCUMENTS

| | | | |
|---|---|---|---|
| 3,683,197 | 8/1972 | Ives | 307/10.1 |
| 3,952,209 | 4/1976 | Shaklee et al. | 307/10.1 |
| 4,280,062 | 7/1981 | Miller et al. | 174/72 A |
| 4,831,726 | 5/1989 | Moly | 29/857 |
| 4,942,499 | 7/1990 | Shibata et al. | 174/72 A |
| 4,942,571 | 7/1990 | Möller et al. | 307/10.1 |

FOREIGN PATENT DOCUMENTS

| | | |
|---|---|---|
| 1283708 | 11/1989 | Japan . |
| 1369798 | 12/1971 | United Kingdom . |
| 1493532 | 1/1975 | United Kingdom . |

*Primary Examiner*—William M. Shoop, Jr.
*Assistant Examiner*—Peter Ganjoo
*Attorney, Agent, or Firm*—Sughrue, Mion, Zinn, Macpeak & Seas

[57] ABSTRACT

In the production of a wire harness for an appliance whose circuit differs depending on a combination of selectable electrical systems, the wire harness is divided beforehand into the common circuit which is always provided independently of the presence or absence of the selectable electrical systems and the dedicated circuits one for each of the selectable electrical systems, the wire harness for the appliance is separated into a common circuit and dedicated circuits one for each of the associated electrical systems when an order of an appliance is made, a number of common circuits and a number of each of the dedicated circuits for the electrical systems are added up, the added up number of an common circuits and the dedicated circuits are manufactured and the common circuit and the dedicated circuits of the associated electric systems are combined to produce wire harnesses of the ordered appliances, whereby simple production control and high production efficiency are assured and changes is production or design can be readily coped with.

12 Claims, 9 Drawing Sheets

WIRE HARNESS PRODUCTION CONTROLLING METHOD

BACKGROUND OF THE INVENTION

1. Field of the Invention

The present invention relates to a method of production controlling a wire harness for use in vehicles or industrial or household appliances.

2. Prior Art

Figure 9:
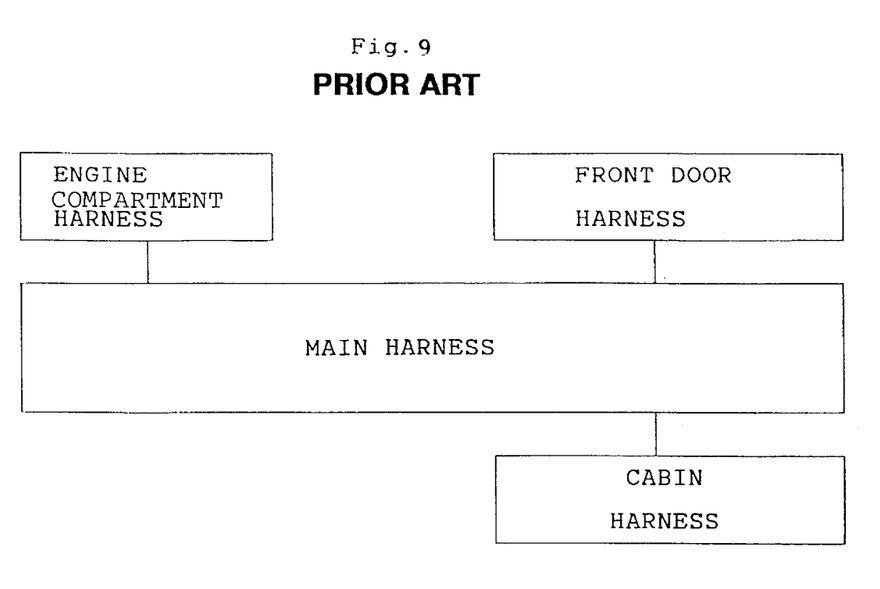
FIG. 9 is a block diagram of various wire harnesses in a vehicle.

A wire harness, for example, for a vehicle comprises many sections, including an engine compartment harness, a main harness, a cabin harness, a front door harness and so on. (see, e.g., FIG. 9) The circuitry of each of these harness sections differs depending on the car model, engine model, door model (hereinafter referred to as a car model), the grade of specification. A harness number is assigned to each of the different circuits of different harness sections. That is, production control and manufacture of the wire harness are conducted for each of these harness numbers. For example, assuming that the main harness of a certain car model contains, in addition to the basic or normally installed equipment such as a ratio, air conditioner, and a trunk compartment lamp, some of four selectable electrical systems, including a four wheel drive system, an electronic control suspension system, an anti-lock braking system and a keyless entry system (a system in which the car door can be opened/closed by means of a card), 16 different harness numbers are required to cover all possible combinations of these four electrical systems. This applies not only to the main harness but also to each of the other harness sections, including an engine compartment harness, cabin harness, and front door harness. Further, there are 16 different harness numbers for every harness section of every car model. The wire harness for a single vehicle is constituted of a combination of harnesses bearing particular harness numbers of respective harness sections which are determined by a combination of selected electrical systems.

However, there is a tendency towards an increase in the number of harness numbers due to diversification of car models, grades or specifications, and thus there is a tendency towards small-scale variated production of wire harnesses, making production control difficult. That is, an increase in the number of harness numbers makes production control of a wire harness troublesome and mass production impossible, thereby resulting in a decrease in productivity. Furthermore, since a wire harness is manufactured corresponding to each of harness numbers, when a variation in the production quantity of a harness occurs, manufacture of the entire harness section must be corrected to re-adjust the production quantity, thus making the manufacture difficult. Particularly, in the case of wire harnesses for vehicles, a change in the combination of electrical systems brings about a change not only in a single harness section but also in the harness numbers of all the other harness sections, making the manufacture difficult. Furthermore, when a change in design occurs, the manufacture of the entire harness circuit must be corrected to adjust the circuit configuration, making manufacture difficult.

Conventionally, a production system of an automobile manufacturer employs matrix data, comprising a combination of digits, letters and symbols for the automobile manufacturer to receive an order from a dealer. The matrix data indicates a combination of harness numbers which constitute an entire harness system in a single vehicle which differs depending on the car model, grade, specification or the like. The dealer inputs from a terminal machine thereof the matrix data of the vehicle that the dealer has received from a customer, whereby the orders from respective dealers are accumulated in a computer in a production control department of the automobile manufacturer. The automobile manufacturer adds up the data periodically, and puts in an order of wire harness to a harness maker. Thus, the production control department of an automobile manufacturer analyzes harnesses required for every harness section and every car model, i.e., for every harness number, adds up the required number, and puts in an order to the harness maker. The harness maker is required to control the production quantity such that a combination of harness numbers of respective harness sections matches the ordered vehicle number, making the control troublesome. Furthermore, when a cancellation of or a change in the order from the dealer occurs after the order has been made, addition must be performed again, making the production control a time-consuming task.

SUMMARY OF THE INVENTION

In view of the aforementioned problems of the prior art, a primary object of the present invention is to provide a wire harness production controlling method which assures easy production control and high production efficiency, and which allows changes in production or design to be readily dealt with.

A subject object of the present invention is to provide a wire harness production controlling method which eliminates the need for analysis of required harnesses and addition thereof for every harness number to be conducted by an appliance maker, and which enables changes in an order to be readily dealt with.

To achieve the above-described primary object, the present invention provides a wire harness production controlling method which comprises the steps of dividing a wire harness beforehand into a common circuit which is always provided independently of the presence or absence of selectable electrical systems and dedicated circuits one for each of the selectable electrical systems in order to produce the wire harness for an appliance the circuit of which differs depending on a combination of selectable electrical systems, separating the wire harness of each appliance on order into the common circuit and the dedicated circuits one for each of the associated electrical systems when an order is placed, adding up a number of common circuits and a number of each of the dedicated circuits one for each of the electrical systems, manufacturing the added up number of common circuits and the dedicated circuits, and combining the common circuit with the dedicated circuits of the associated electrical systems to produce wire harnesses of the ordered appliances.

To achieve the second object, the present invention provides a wire harness production controlling method which comprises the steps of dividing a wire harness beforehand into a common circuit which is always provided independently of the presence or absence of selectable electrical systems and dedicated circuits one for each of the selectable electrical systems in order to produce the wire harness for an appliance whose circuit differs depending on a combination of selectable electrical systems, indicating a combination of the common circuit and the dedicated circuits one for each of the selectable electrical systems, which constitute the wire harnesses of the appliance, in the form of matrix data which is a combination of digits, symbols, letters and so on, putting in an order for the appliance by inputting matrix data from a terminal, whereby an order number of the common circuits and an ordered number of each of the dedicated circuits for the electrical systems are added up in a harness maker's computer, manufacturing the added up number of common circuits and the dedicated circuits one for each of the electrical systems, and combining the common circuit with the dedicated circuits of the associated electrical systems to produce wire harnesses of the ordered appliances.

The circuit configuration differs depending on a combination of selectable electrical systems which in turn depends on the grade, specification or the like. Thus, a desired wire harness can be readily formed by being divided it into a common circuit, which is contained independently of the presence or absence of the selectable electrical systems, and dedicated circuits one for each of the selectable electrical systems, and by detachably joining the common circuit with the dedicated circuits of the selected electrical systems using a branch connector.

Furthermore, in the present invention, since addition and production control are performed not for each of the harness numbers which differ depending on a combination of electrical systems but for each of the common circuit and dedicated circuits one for each of the selectable electrical systems, the number of harnesses to be production controlled is reduced, making production control easy. Also, since the common circuit and the dedicated circuits one for each of the selectable electrical systems are all the products to be produced, the production lot can be increased, making mass production possible.

Furthermore, changes in production quantity can be dealt with simply by changing the combination of the dedicated circuits for the electrical systems which constitute a part of the wire harness, making change in production quantity easy.

Furthermore, changes in design can be dealt with simply by changing the dedicated circuits of the electrical systems of an appliance or equipment to be changed, making the changes in design easy.

Furthermore, when an order of the appliance from a dealer or changes in the order is input in the form of matrix data directly from a dealer's terminal or through an appliance maker's terminal to a harness maker's computer, the number of common circuits and the number of dedicated circuits, one for each of the selectable electrical systems, which constitute the wire harness of an appliance on order, are added up in the harness maker's computer each time the order or changes in the order is made. Therefore, it is not necessary for the appliance maker to perform troublesome analysis of the required harnesses and addition for every harness number, making control easy.

The above and other objects, features and advantages of the present invention will become more apparent from the following description when taken in conjunction with the accompanying drawings in which a preferred embodiment of the present invention is shown by way of illustrative examples.

PREFERRED EMBODIMENT OF THE INVENTION

An embodiment of the present invention will now be described with reference to the accompanying drawings.

Figure 1:
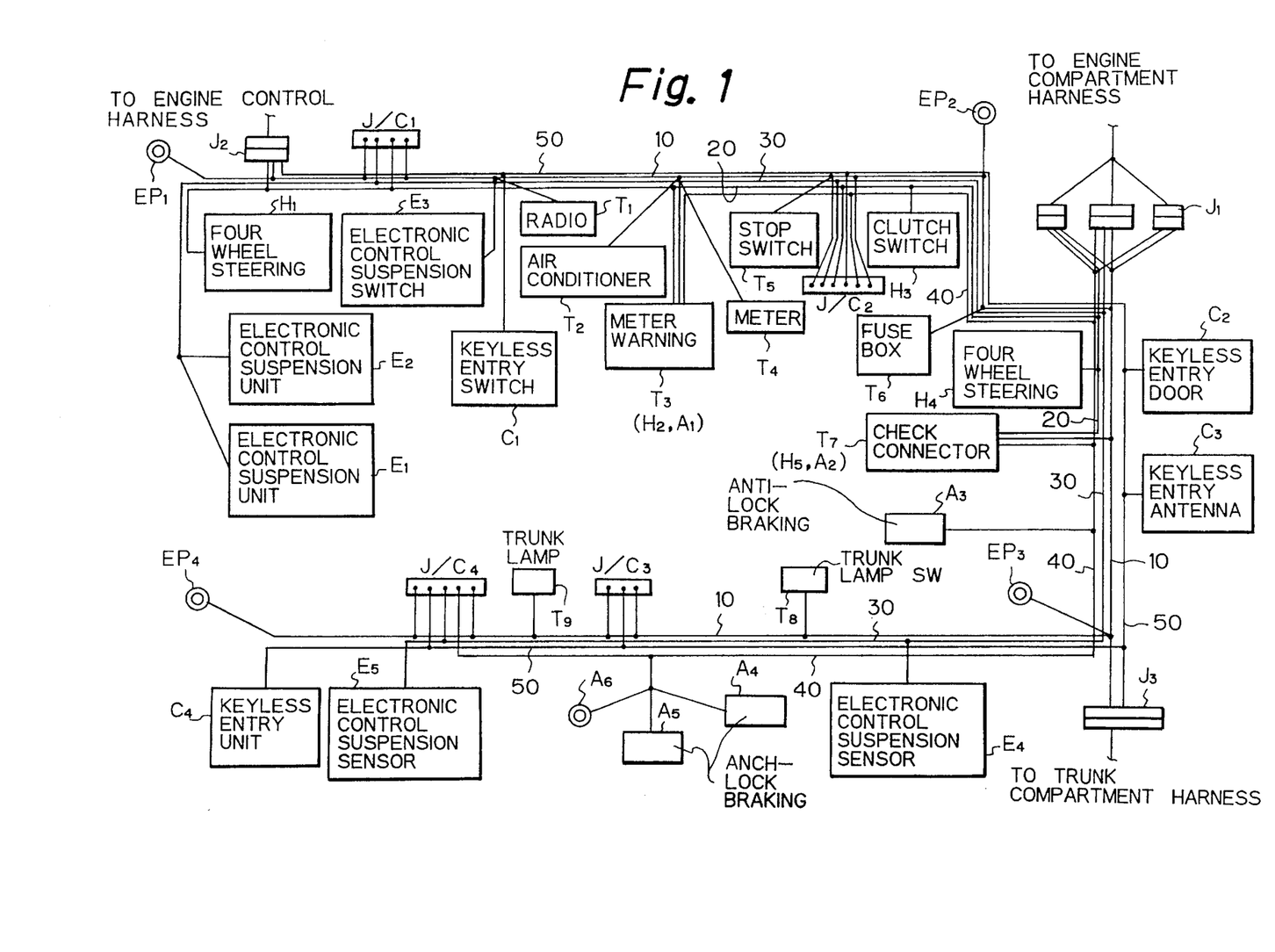
FIG. 1 illustrates, together with the electrical systems, an example of the wiring structure of a main harness for a vehicle according to the present invention.

FIG. 1 illustrates, together with associated electrical equipment, a wiring structure of a main harness for a vehicle to which the present invention is applied.

In the figure, J1 designates a connector for connecting the main harness to an engine compartment harness (not shown), J2 designates a connector for connecting the main harness to an engine control harness (not shown), J3 designates a connector for connecting the main harness to a trunk compartment harness (not shown), and $EP_1$ through $EP_4$ designate ground points.

The main harness shown in FIG. 1 is for a vehicle on order which incorporates, as selectable electrical systems, a four wheel drive system, an electronic control suspension system, anti-lock braking system, and a keyless entry system.

Figure 2:
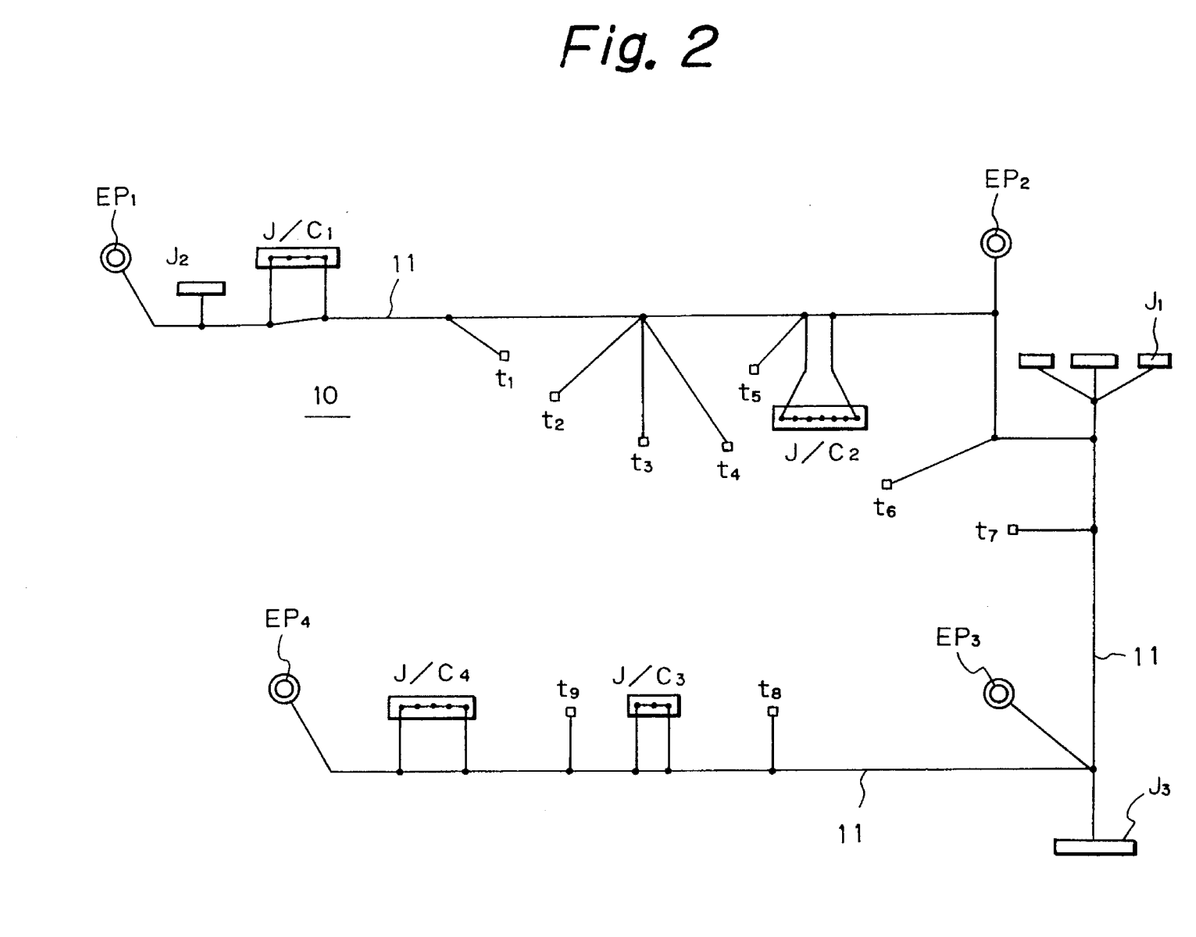
FIG. 2 is a wiring diagram of a common circuit which constitutes the main harness.
Figure 3A:
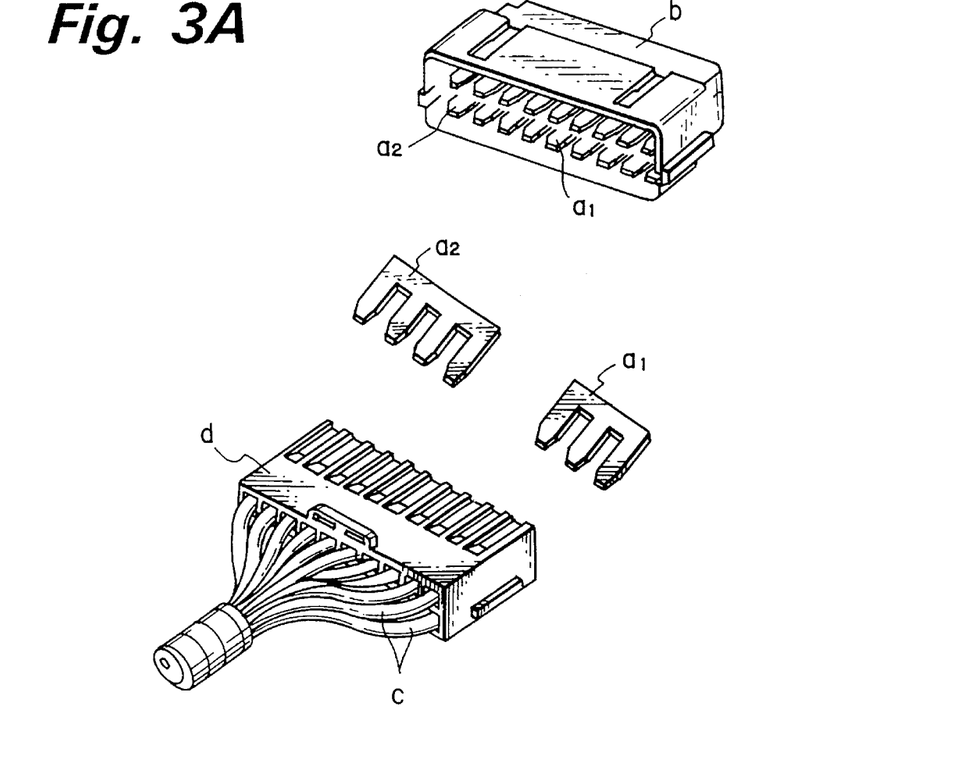
FIG. 3(a) is a perspective view showing the structure of a joint connector used for connection between the common circuit and the dedicated circuits according to the present invention.
Figures 3B, 3C:
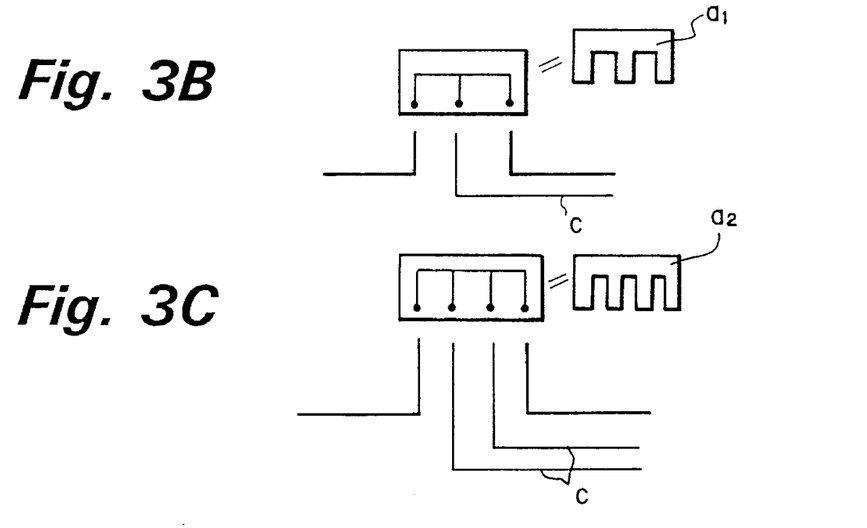
FIGS. 3(b) and 3(c) are diagrams showing the internal circuits of the joint connector.

The main harness according to the present invention is divided into a common circuit 10, which is always provided independently of the presence or absence of a four wheel drive system, electronic control suspension system, anti-lock braking system or keyless entry system, and independent dedicated circuits 20, 30, 40 and 50 respectively provided for those electrical systems. The main harness is constructed by combining the common circuit 10 with the dedicated circuits 20, 30, 40 and 50 one for each of the electrical systems. As shown in FIG. 2, the common circuit 10 includes a circuit group 11 having a power source circuit, a grounding circuit and signal circuits for the basic or normally-installed electrical equipment, the connector $J_1$ to be connected to the engine compartment harness, $J_2$ to be connected to the engine control harness, $J_3$ to be connected to the trunk compartment harness, the grounding points $EP_1$ through $EP_4$, and terminal $t_1$ through $t_9$ to be connected to the normally-installed electrical equipment $T_1$ through $T_9$, including a radio, an air conditioner, a meter and so on. The connectors $J_1$, $J_2$, $J_3$, the grounding points $EP_1$ through $EP_4$ and the terminals $t_1$ through $t_9$ are connected to the corresponding circuits in the circuit group 11. In the power circuit and the ground circuit of the circuit group 11 are interposed joint connectors $J/C_1$ through $J/C_4$. The joint connector J/C has the function of making terminals of the dedicated circuits readily connected to the main circuit while maintaining the connection of the main circuit to other portions unchanged. In a practical structure, as shown in FIG. 3(a), the joint connector J/C includes a connector housing b which contains a large number of connector terminals a1, a2, and a connector member d which laces or bundles terminals c from the dedicated circuits of the respective electrical systems and terminals c from the common circuit and which can be inserted into the connector housing b by one step. FIG. 3(b) shows connection of one of the terminals c from the dedicated circuits to the terminals c of the common circuit. FIG. 3(c) shows connection of two terminals c to the terminals c of the common circuit. The dedicated circuit for each of the electrical systems can be readily connected to the power source circuit and grounding circuit of the common circuit by one-step inserting the terminals c from each of the electrical systems and terminals c from the common circuit into the connector member d and then by inserting the connector member d into the connector housing b.

Figure 4:
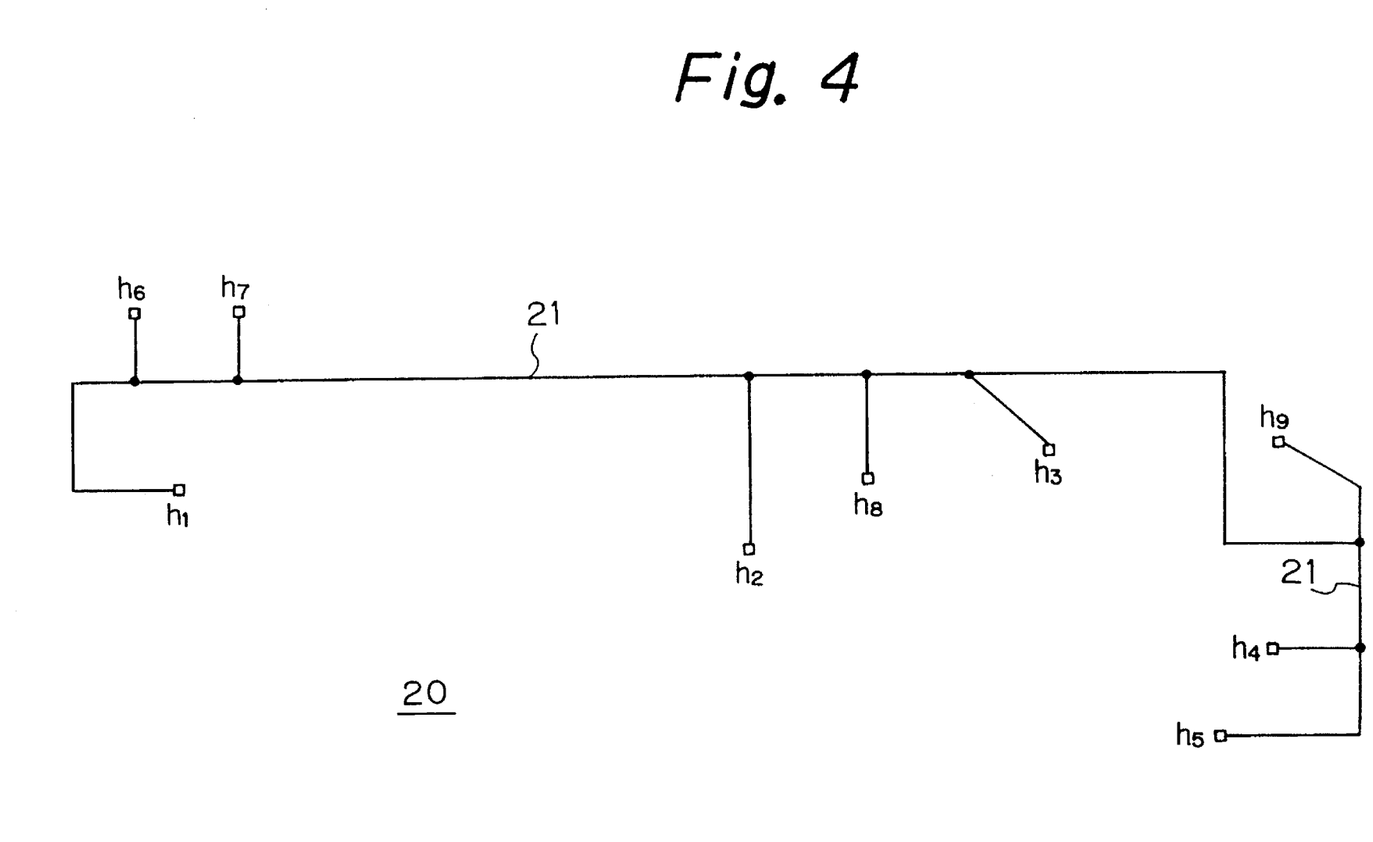
FIG. 4 is a wiring diagram of a four wheel steering system which constitutes the main harness.

As shown in FIG. 4, the dedicated circuit 20 for the four wheel drive system includes: a circuit group 21 having a power source circuit, a grounding circuit and a system signal circuit; terminals $h_1$ through $h_5$ to be inserted into devices $H_1$ through $H_5$ which are associated with a four wheel drive system, including a four wheel drive unit, a four wheel drive switch, an alarm lamp and so on which are connected to the corresponding circuits in the circuit group 21; a terminal $h_6$ to be inserted into the connector $J_2$ which in turn to be joined to the engine control harness; a terminal $h_7$ to be inserted into $J/C_1$; a terminal $h_8$ to be inserted into $J/C_2$; and a terminal $h_9$ to be inserted into the connector $J_1$ which in turn to be jointed to the engine compartment harness.

Figure 5:
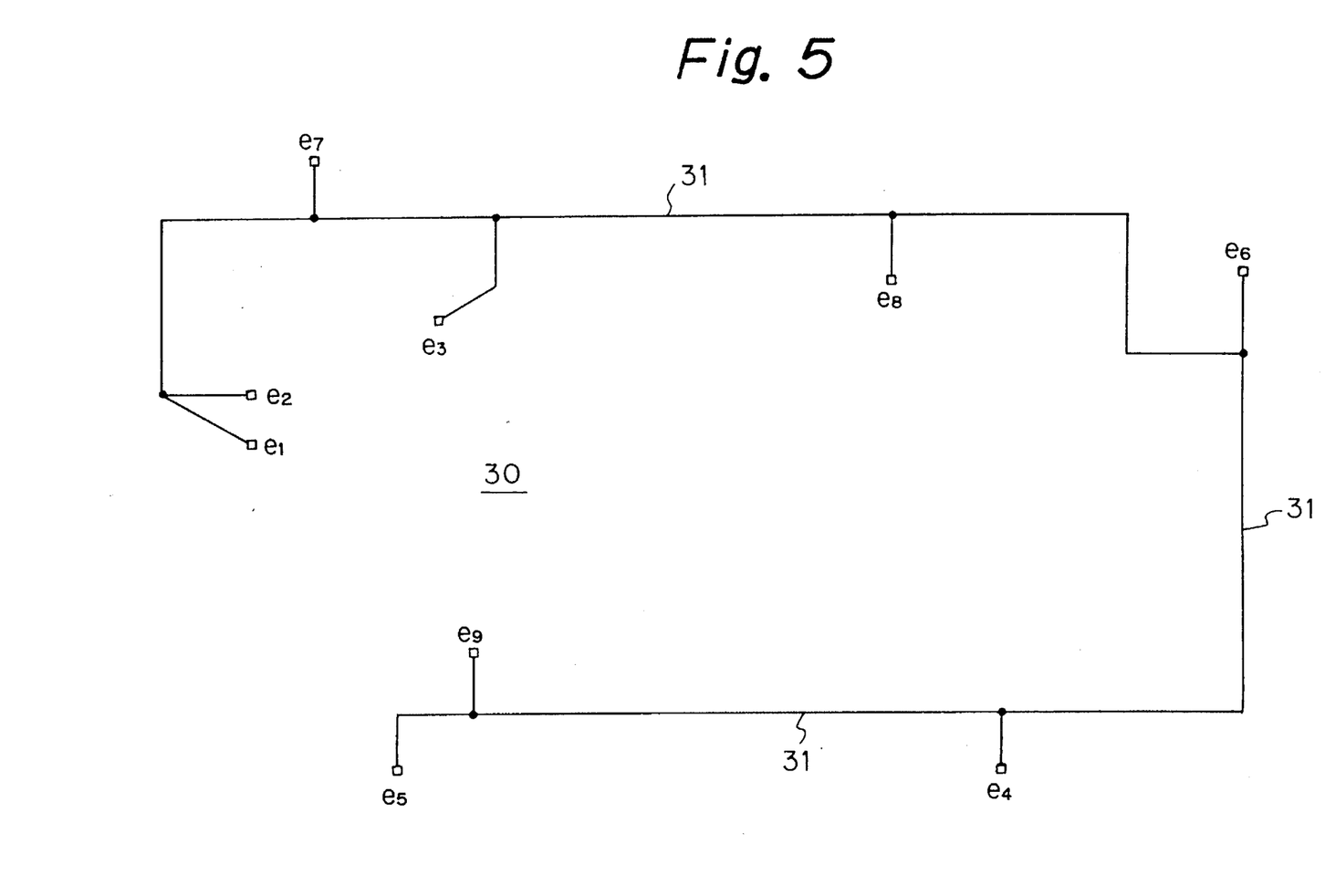
FIG. 5 is a wiring diagram of an electronic control suspension system which constitutes the main harness.

As shown in FIG. 5, the dedicated circuit 30 for the electronic control suspension system includes: a circuit group 31 having a power source circuit, a grounding circuit, and a system signal circuit; terminals $e_1$ through $e_5$ to be inserted into devices $E_1$ through $E_5$ which are associated with the electronic control suspension system, including an electronic control suspension unit, an electronic control suspension switch, an electronic control suspension sensor and so on which are connected to the corresponding circuits in the circuit group 31; a terminal $e_6$ to be inserted into the connector $J_1$ which in turn to be joined to the engine compartment harness; a terminal $e_7$ to be inserted into $J/C_1$; a terminal $e_8$ to be inserted into $J/C_2$; and a terminal $e_9$ to be inserted into $J/C_4$.

Figure 6:
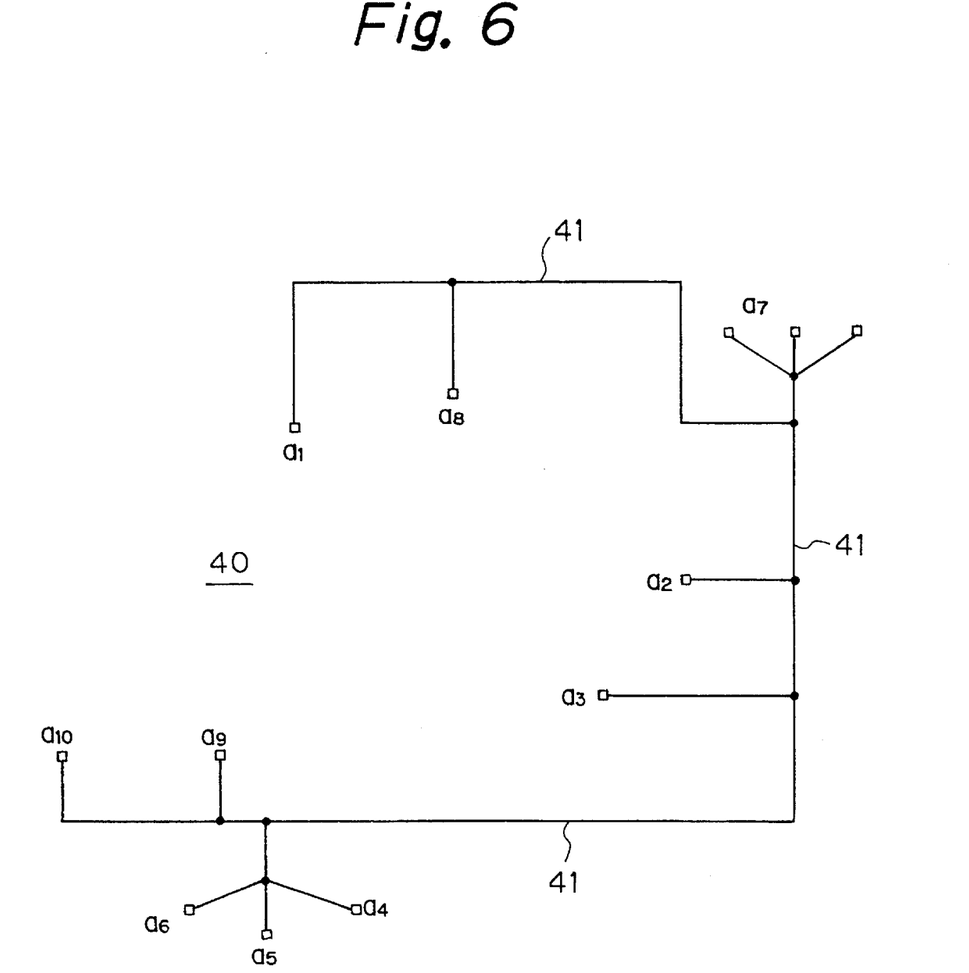
FIG. 6 is a wiring diagram of an anti-lock braking system which constitutes the main harness.

As shown in FIG. 6, the dedicated circuit 40 for an anti-lock braking system includes: a circuit group 41 having a power source circuit, a ground circuit, and a system signal circuit; terminals $a_1$ through $a_6$ to be inserted into devices $A_1$ through $A_6$ which are associated with the anti-lock braking system, including an anti-lock braking unit, an alarm lamp and so on which are connected to the corresponding circuits in the circuit group 41; a terminal $a_7$ to be inserted into the connector $J_1$ which in turn to be joined to the engine compartment harness; a terminal $a_8$ to be inserted into $J/C_2$; a terminal $a_9$ to be inserted into $J/C_3$; and a terminal $a_{10}$ to be inserted into $J/C_4$.

Figure 7:
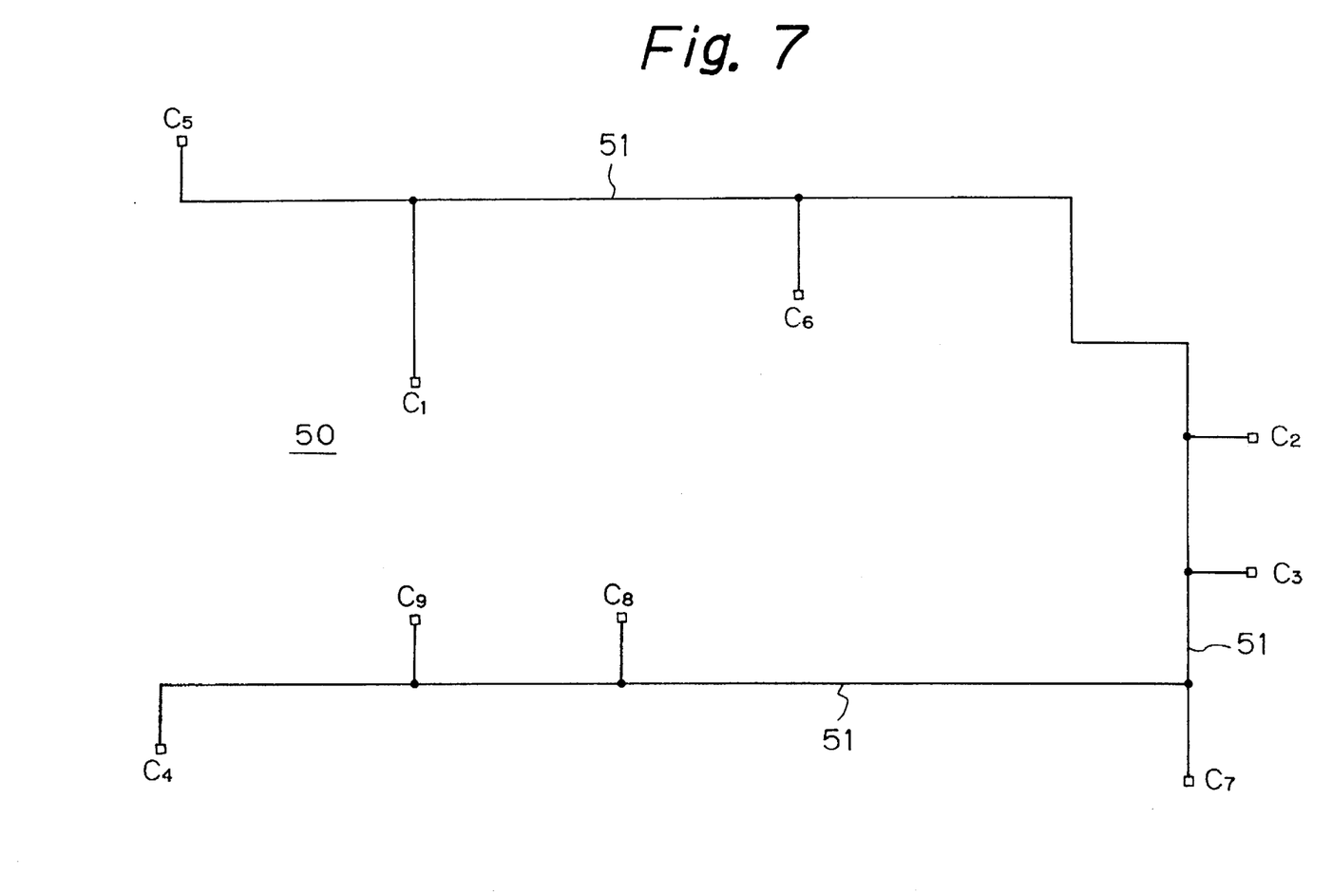
FIG. 7 is a wiring diagram of a keyless entry system which constitutes the main harness.

As shown in FIG. 7, the dedicated circuit 50 for the keyless entry system includes: a circuit group 51 having a power source circuit, a grounding circuit, and a system signal circuit; terminals $c_1$ through $c_4$ to be inserted into devices $C_1$ through $C_4$ which are associated with the keyless entry system, including a keyless entry unit, a keyless entry switch, a keyless entry door and so on which are connected to the corresponding circuits in the circuit group 51; a terminal $c_5$ to be inserted into $J/C_1$; a terminal $c_6$ to be inserted into $J/C_2$; a terminal $c_7$ to be inserted into the connector $J_3$ which in turn to be joined to the trunk compartment harness; a terminal $c_8$ to be inserted into $J/C_3$; and a terminal $c_9$ to be inserted into $J/C_4$.

To combine the common circuit 10 with the dedicated circuits 20 through 50 for the respective electrical systems to construct the main harness, the corresponding portions of the circuit groups of the respective circuits are laid parallel to each other, the terminals of the dedicated circuits for the respective electrical systems are one-step inserted into the corresponding connectors $J_1$ through $J_4$ and $J/C_1$ through $J/C_4$ of the common circuit, and the circuit groups are bundled by means of a tape or covered with a tube, as shown in FIG. 1. Combinations between the common circuit and the dedicated circuits for the electrical systems is performed by detachably joining them using J/C on a plurality of working tables moved by a conveyor.

Figure 8:
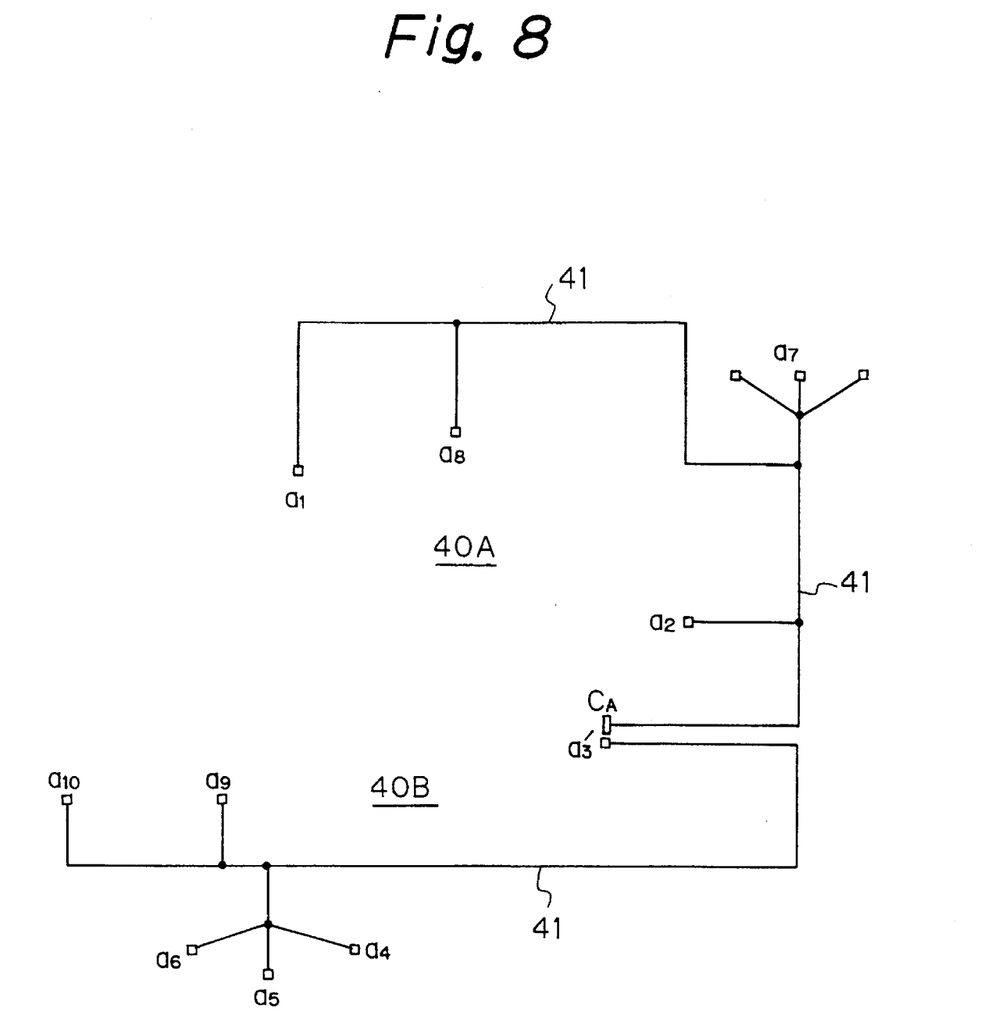
FIG. 8 is a wiring diagram of an anti-lock braking system shown in FIG. 6 which is divided into sub circuits.

To construct a main harness for an appliance which contains a combination of two or three electrical systems, the dedicated circuits for these two or three electrical systems are joined to the common circuit. A main harness for an appliance which contains electrical systems other than the above-mentioned can be constructed in the same manner by combining the common circuit and the dedicated circuits for the electrical systems.

Where the wiring structure of the common circuit or any of the dedicated circuits for the selectable electrical systems is complicated, the circuit may be divided into a plurality of sub circuits which can be one-step joined to each other using a connector and a terminal. For example, the circuit for an anti-lock braking system shown in FIG. 6 may be divided into a sub circuit 40A having a connector $c_A$ to be connected to the anti-lock braking sensor $A_2$, and a sub circuit 40B having a terminal $a_3$, to be one-step connected to the connector $c_A$. The degree of division of the circuit into sub circuits depends on the volume of the circuit group in the common circuit or the dedicated circuits for the electrical systems.

Also, the common circuit may be separated into basic circuits each constitutes a circuit for each basic equipment of the appliance.

In the thus-arranged wire harness which is made up of a combination of a common circuit and respective dedicated circuits one for each of the selectable electrical systems, production control is easy and mass production or changes in production can readily be coped with. There are 16 types of wire harnesses, as shown in Table 1, when there are, for example, four electrical systems, including the four wheel drive system, the keyless entry system, the anti-lock braking system and electronic control suspension system, to be contained in the wire harness.

TABLE 1

| | Common circuit | Four wheel drive | Keyless entry | Anti-lock braking | Electronic control suspension |
|---|---|---|---|---|---|
| Harness | | | | | |
| A | Contained | Contained | Not contained | Not contained | Not contained |
| B | " | " | Not contained | Not contained | Contained |

TABLE 1-continued

| | Common circuit | Four wheel drive | Keyless entry | Anti-lock braking | Electronic control suspension |
|---|---|---|---|---|---|
| C | " | " | Not contained | Contained | Not contained |
| D | " | " | Contained | Not contained | Not contained |
| E | " | " | Not contained | Contained | Contained |
| F | " | " | Contained | " | Not contained |
| G | " | " | " | Not contained | Contained |
| H | " | " | " | Contained | " |
| I | " | Not contained | Not contained | Not contained | Not contained |
| J | " | Not contained | Not contained | Not contained | Contained |
| K | " | Not contained | Not contained | Contained | Not contained |
| L | " | Not contained | Contained | Not contained | Not contained |
| M | " | Not contained | Not contained | Contained | Contained |
| N | " | Not contained | Contained | " | Not contained |
| O | " | Not contained | " | Not contained | Contained |
| P | " | Not contained | " | Contained | " |

Whereas 16 types of harnesses A through P formed by combinations of the four electrical systems must be conventionally controlled, the number of types that must be production controlled in this embodiment is 5, including the common circuit and four dedicated circuits, making production control easy.

Furthermore, since the manufacture of a wire harness concentrates on the manufacture of a common circuit and dedicated circuits one for each of the selectable electrical systems, the production lot can be increases, thus improving productivity.

For example, Table 2 shows the relation between the production quantity of harnesses A through P and the production quantity of the common circuit and dedicated circuits for the electrical systems which are required for the production of these harnesses.

TABLE 2

| | Planned Production quantity | Common circuit | Four wheel drive | Keyless entry | Anti-lock braking | (Unit: Set) Electronic control suspension |
|---|---|---|---|---|---|---|
| Harness | | | | | | |
| A | 100 | 100 | 100 | 0 | 0 | 0 |
| B | 20 | 20 | 20 | 0 | 0 | 20 |
| C | 10 | 10 | 0 | 10 | 0 | 0 |
| D | 130 | 130 | 130 | 130 | 0 | 0 |
| E | 5 | 5 | 5 | 0 | 5 | 5 |
| F | 10 | 10 | 10 | 10 | 10 | 0 |
| G | 20 | 20 | 20 | 20 | 0 | 20 |
| H | 40 | 40 | 40 | 40 | 40 | 40 |
| I | 100 | 100 | 0 | 0 | 0 | 0 |
| J | 20 | 20 | 0 | 0 | 0 | 20 |
| K | 10 | 10 | 0 | 0 | 10 | 10 |
| L | 130 | 130 | 0 | 130 | 0 | 0 |
| M | 5 | 5 | 0 | 0 | 5 | 5 |

TABLE 2-continued

| | Planned Production quantity | Common circuit | Four wheel drive | Keyless entry | Anti-lock braking | (Unit: Set) Electronic control suspension |
|---|---|---|---|---|---|---|
| N | 10 | 10 | 0 | 10 | 10 | 10 |
| O | 20 | 20 | 0 | 20 | 0 | 20 |
| P | 40 | 40 | 0 | 40 | 40 | 40 |
| Total | 870 | 670 | 325 | 410 | 120 | 180 |

In Table 2, the left side planned production quantity denotes an example of the number of harnesses A through P to be produced. Since every harness A through P includes a common circuit, the number of the common circuits of these harnesses is the same as the planned quantity of the harnesses. However, since the existence or non-existence of the dedicated circuit for electrical systems depends on the type of the harness, the number of the dedicated circuits for each electrical system shown in Table 2 is the same as the planned quantity when a harness contains such an electrical system, and is zero when a harness does not contain such a system. Whether or not a specific electrical system is included in harnesses A through P is determined from Table 1. From Table 2, it will be understood that the production lot is determined by the total number of the common circuit and the dedicated circuits for the electrical systems, and it is relatively high when designed according to the present invention.

More specifically, in a conventional production method based on the design for each of the individual harness numbers, the maximum quantity of the production lot is 130 for harnesses D and L while the minimum quantity thereof is 5 for harnesses E and M. However, in the production method according to this embodiment, the maximum quantity of the production lot is 670 for the common circuit while the minimum quantity thereof is 120 the dedicated circuit of an anti-lock braking system. Thus, mass production can be performed using the production facility, such as a conveyor type production line.

Furthermore, an increase or decrease in the production quantity is cancelled due to the common use of the common circuit and dedicated circuits for the electrical systems, the influence of changes in production is lessened. If changes in the production quantities of harnesses A through P, for example, as shown in Table 3 do occur, the production quantities of the common circuit and dedicated circuits changes as follows:

TABLE 3

(Unit: Set)

| Harness | Planned quantity | Quantity to be altered | Common circuit | Four wheel drive | Keyless entry | Anti-lock braking | Electronic control suspension |
|---|---|---|---|---|---|---|---|
| A | 100 | +20 | +20 | +20 | 0 | 0 | 0 |
| B | 20 | −20 | −20 | −20 | 0 | 0 | −20 |
| C | 10 | +40 | +40 | 0 | +40 | 0 | 0 |
| D | 130 | −10 | −10 | −10 | −10 | 0 | 0 |
| E | 5 | +5 | +5 | +5 | 0 | +5 | +5 |
| F | 10 | +20 | +20 | +20 | +20 | +20 | 0 |
| G | 20 | −10 | −10 | −10 | −10 | 0 | −10 |
| H | 40 | −30 | −30 | −30 | −30 | −30 | −30 |
| I | 100 | −50 | −50 | 0 | 0 | 0 | 0 |
| J | 20 | +20 | +20 | 0 | 0 | 0 | +20 |
| K | 10 | +10 | +10 | 0 | 0 | +10 | +10 |
| L | 130 | +20 | +20 | 0 | +20 | 0 | 0 |
| M | 5 | +5 | +5 | 0 | 0 | +5 | +5 |
| N | 10 | −5 | −5 | 0 | −5 | −5 | −5 |
| O | 20 | +10 | +10 | 0 | +10 | 0 | +10 |
| P | 40 | −20 | −20 | 0 | −20 | −20 | −20 |
| Total | 670 | +5 | +5 | −25 | +15 | −15 | −35 |

In Table 3, since the every harness A through P includes a common circuit, the number of common circuits to be altered is the same as the quantity of the harnesses to be altered. Also, the number of dedicated circuits for each electrical system to be altered is the same as the quantity of the harnesses to be altered when the harness does not contain a system. Whether or not a specific harness includes such an electrical system is determined from Table 1, as stated above. From Table 3, it will be understood that variations in the production quantity, which is determined by the total number in the table, are relatively small if designed according to the present invention.

More specifically, whereas in a conventional production method based on an individual harness number, there are variations in the production quantity of the individual harness between the maximum value of +40 (harness C) and the minimum value of −50 (harness I), there are variations of the dedicated circuits only between the maximum value of +15 (the dedicated circuit for the keyless entry system) and the minimum value of −35 (the dedicated circuit for the electronic control suspension system) in the production method of this embodiment, making manufacture easy. Particularly, there is only a slight change in the production quantity of the common circuit having a complicated circuit configuration.

Next, the matrix data used in the production control method according to the present invention will be described below.

The structure of the wire harness for a vehicle differs depending on the car model, door model, engine model, handle, grade or specifications. To indicate which harnesses are used in one vehicle, matrix data made up of digits, alphabets and symbols is used: For example, if a vehicle on order is:

Car model: A
Door model: 4 doors
Engine model: gasoline engine
Steering: right-handed
Specifications:
    anti-lock braking system
    four wheel steering system
    electronic control suspension system
    keyless entry system the matrix data is [A 1 8 # A H E C]
where
    A: car model A
    1: 4 doors
    8: gasoline engine
    #: right-handed steering
    A: with the anti-lock braking system
    H: with the four wheel steering system
    E: with the electronic control suspension system
    C: with the keyless entry system When the matrix data is input from a terminal of a dealer or an automobile manufacturer, the wire harness for A18# type vehicle is input to a computer harness maker for every harness section as a combination of the common circuit and the dedicated circuits for the electrical systems which constitute the harness section, as shown in Table 4.

TABLE 4

| Harness section | Engine compartment Harness | Main harness | Cabin harness | Front door harness |
|---|---|---|---|---|
| Common circuit | 1 | 1 | 1 | 1 |
| Anti-lock braking system | 1 | 1 | 1 | 0 |
| Four wheel drive system | 1 | 1 | 1 | 0 |
| Electronic control suspension system | 1 | 1 | 1 | 0 |
| Keyless entry | 1 | 1 | 1 | 1 |

The harness section is displayed for every electrical system which is indicated by matrix data using "1" when the harness of that harness section is associated with the presence of an electrical system and "0" when the harness is not associated with the presence of an electrical system.

In a practical operation, the dealer or automobile manufacturer orders a predetermined number of cars periodically and the ordered number of common circuits and the ordered number of dedicated circuits for the electrical systems are collected for every harness section each time an order arrives. Thus, the harness maker checks the inventory according to an individual order, and manufacturers the harness to make up for the shortage. When a change in the order occurs, the ordered number can be corrected by increasing or decreasing the number of common circuits and the number of each of the dedicated circuits for the electrical systems for every harness section for every car model by using the similar matrix data.

The harness maker constructs a desired wire harness by combining the common circuit and the dedicated circuits of the associated electrical systems for every harness section on the conveyor production line according to the matrix data used for order. Also, since the wire harness of a single vehicle is displayed as a combination of the electrical systems for every harness section when the matrix data is input, the harness maker can supply to the automobile manufacturer the harness sections for the entire vehicle as a unit. The automobile manufacturer can complete assembly of the wire harness by mounting the supplied harness sections for the entire vehicle utilizing the same matrix data when the ordered vehicle arrives on the car assembly line.

Thus, since the same matrix data is used for order, manufacture and assembly of a wire harness, it is not necessary for the automobile manufacturer to analyze wire harness for every car model or to add up wire harnesses for every harness number, making control easy.

In the above described embodiment, the combination of four electrical systems, i.e. the four wheel drive system, keyless entry system, anti-lock braking system and electronic control suspension system, of the main harness, which comprises one of the harness sections of the wire harness for vehicles, has been described. However, the present invention can also be applied to a combination of other electrical systems or to a harness other than the main harness, such as an engine compartment harness, cabin harness or front door harness. Also, the present invention can be applied to an appliance containing electrical systems other than wire harnesses for vehicles, such as industrial or household appliances.

As will be understood from the foregoing description, the wire harness production control method according to the present invention assures easy production control, high production efficiency and can readily dealt with variations in the production quantity or design.

Furthermore, the need for analysis of desired harnesses and for adding up harness numbers for every harness section, conducted by the appliance maker, is eliminated, and changes in an order can thus be readily dealt with.

What is claimed is:

1. A wire harness production method for the production of wire harnesses to be used in appliances of different models, wherein each of the different models includes a normally installed electrical equipment and at least one optional electrical system selected from a plurality of selectable electrical systems, comprising the steps of:

designing a common circuit which is designed to be installed in each of the appliances regardless of model, and which includes a circuit group of a power source circuit, a grounding circuit and signal circuits associated with the normally installed electrical equipment;

designing a plurality of dedicated circuits each designed to be used with one of the selectable electrical system and each including a circuit group of a power source circuit, a grounding circuit and a system signal circuit associated with one of the selectable electrical systems;

determining the number of the common circuit and the dedicated circuits to be produced by setting the number of common circuits to be produced as equal to the total number of appliances to be produced, and respectively adding up a number of each of the dedicated circuits included in the appliances of the different models to be produced by determining the number of the optional electrical systems selected for the total number of appliances to be produced;

separately manufacturing common circuits in an amount equal to the added up number of common circuits and manufacturing each of the dedicated circuits in an amount equal to the added up number of the respective dedicated circuit;

affixing connectors to said common circuits and to each of said dedicated circuits; and combining the common circuits with the associated dedicated circuits based on the combination of optional electrical systems selected for each appliance to produce wire harnesses appliances of different models by connecting connectors of said common circuits with respective connectors of the optional electrical systems selected for each appliance.

2. A method according to claim 1, wherein said common circuit and each of said dedicated circuits for each of the selectable electrical systems are divided into a plurality of sub circuits which can be one-step-connected to each other by means of a connector and a terminal, the number of sub circuits being added up for every appliance, an said wire harnesses of the appliances being manufactured by combining the divided sub circuits.

3. A method according to claim 1, wherein said appliance is a vehicle.

4. A method according to claim 3, wherein said wire harness is one of a main harness, an engine compartment harness, a cabin harness and a front door harness.

5. A method according to claim 4, wherein said selectable electrical system includes at least one of a four wheel drive system, a keyless entry system, an anti-lock braking system and an electronic control suspension system.

6. A method according to claim 1, wherein said appliance is an industrial or household appliance.

7. A wire harness production controlling method for controlling the production of wire harnesses to be used in appliances of different models, wherein each of the different models includes a normally installed electrical appliance and at least one electrical system selected from a plurality of selectable electrical systems corresponding to a plurality of features, comprising the steps of:

designing a wire harness for every one of the appliances of different models to comprise a combination of a common circuit which is designed to be installed in each of the appliances regardless of model and which includes a circuit group of a power source circuit, a ground circuit and signal circuits associated with the normally installed electrical equipment, and at least one of a plurality of dedicated circuits each designed to be used with one of the selectable electrical systems and each including a circuit group of a power source circuit, a grounding circuit and a system signal circuit associated with one of the selectable electrical systems;

constructing a matrix data for indicating each of a combination of the common circuit and selected dedicated circuits from the plurality of dedicated circuits which constitutes the wire harnesses of each appliance;

determining the number of the common circuits and the dedicated circuits to be produced by respectively adding up a number of the common circuits and a number of each of the dedicated circuits included in the appliances of the different models to be produced from the matrix data;

separately manufacturing common circuits in an amount equal to the added up number of common circuits and manufacturing each of the dedicated circuits in an amount equal to the added up number of the respective dedicated circuit;

affixing connectors to said common circuits and to each of said dedicated circuits; and combining each common circuit with the associated dedicated circuits based on the matrix data to produce wire harnesses of the appliances of different models to be produced by connecting connectors of said common circuits with respective connectors of the optional electrical systems selected for each appliance.

8. A method according to claim 7, wherein the added number of the common circuits and the added number of each of the dedicated circuits for the selectable electrical system are increased or decreased by changing the entries of said matrix.

9. A method according to claim 7, wherein wire harnesses for a single appliance are manufactured using the matrix data.

10. A method according to claim 7, wherein said appliance is a vehicle.

11. A method according to claim 10, wherein said wire harness includes at least one of a main harness, an engine compartment harness, a cabin harness and a front door harness.

12. A method according to claim 10, wherein said selectable electrical system includes at least one of a four wheel drive system, a keyless entry system, an anti-lock braking system and an electronic control suspension system.

* * * * *